United States Patent [19]

[11] B 3,915,764

Noreika et al.

[45] Oct. 28, 1975

[54] SPUTTERING METHOD FOR GROWTH OF THIN UNIFORM LAYERS OF EPITAXIAL SEMICONDUCTIVE MATERIALS DOPED WITH IMPURITIES

[75] Inventors: Alexander J. Noreika; Maurice H. Francombe, both of Pittsburgh, Pa.

[73] Assignee: Westinghouse Electric Corporation, Pittsburgh, Pa.

[22] Filed: May 18, 1973

[21] Appl. No.: 361,734

[44] Published under the Trial Voluntary Protest Program on January 28, 1975 as document no. B 361,734.

[52] U.S. Cl. ................ 148/175; 148/174; 204/164; 204/192

[51] Int. Cl.² ........................................... H01l 7/36

[58] Field of Search ............ 148/174, 175; 204/192, 204/164

[56] References Cited

UNITED STATES PATENTS

| | | | |
|---|---|---|---|
| 3,372,069 | 3/1968 | Bailey et al. | 148/175 |
| 3,450,581 | 6/1969 | Shortes | 204/192 |
| 3,660,180 | 5/1972 | Wajda | 148/175 |
| 3,673,071 | 6/1972 | Pritchard et al. | 204/192 |
| 3,716,404 | 2/1973 | Hirao et al. | 148/175 |
| 3,751,310 | 8/1973 | Cho | 148/175 |

OTHER PUBLICATIONS

Manaseit, H. et al.; Heteroepitaxial GaAs... Formation and Prop. of Zn-Doped Films; in Sol. State Sci. & Techn., 1972, pp. 99–103. [J. Elect. Chem. Soc.].

*Primary Examiner*—Walter R. Satterfield
*Attorney, Agent, or Firm*—J. B. Hinson

[57] ABSTRACT

An RF sputtering process which permits the controlled growth of doped, epitaxial layers of semiconductive materials, highly uniform in thickness and suitable for high frequency microwave applications. An essential feature of the process is the introduction, during sputtering, of an N-type or P-type impurity as a gaseous chemical compound in which the metallic element is liberated in the confined RF discharge.

6 Claims, 1 Drawing Figure

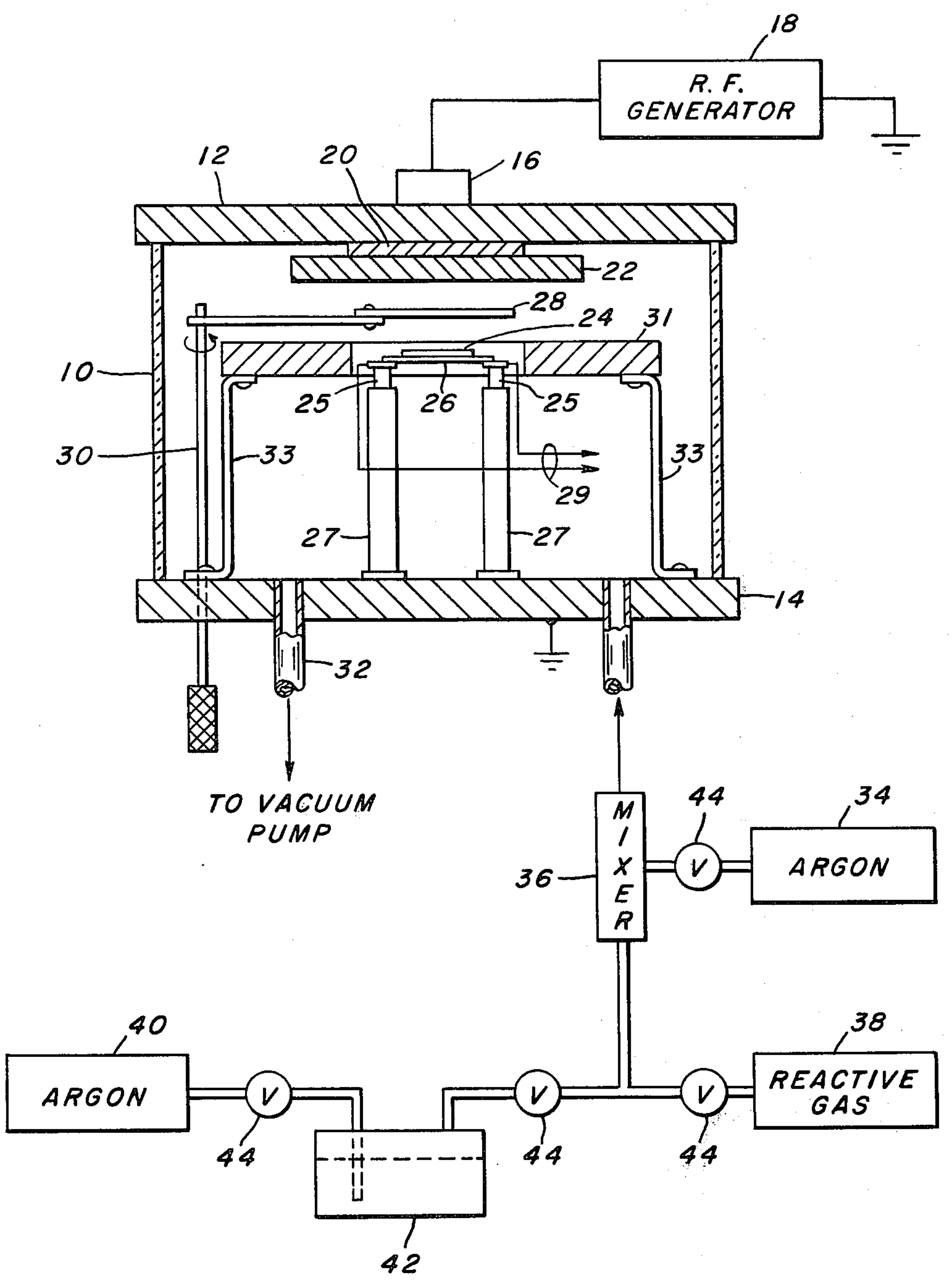
18
R. F. GENERATOR
12
20
16
22
28
24
31
10
25
26
25
30
33
33
29
27
27
14
32
TO VACUUM PUMP
M I X E R
36
44
V
34
ARGON
40
ARGON
V
44
42
V
44
V
44
38
REACTIVE GAS

SPUTTERING METHOD FOR GROWTH OF THIN UNIFORM LAYERS OF EPITAXIAL SEMICONDUCTIVE MATERIALS DOPED WITH IMPURITIES

BACKGROUND OF THE INVENTION

While not limited thereto, the present invention is particularly adapted for use in the formation of thin, doped layers of epitaxial gallium arsenide and other semiconductive materials. Devices requiring such films include microwave varactor diodes, microwave field effect transistors and IMPATT diodes. The fabrication of devices with predetermined frequency characteristics demands accurate control of the epitaxial layer thickness and doping, the former values ranging typically between 0.5 and 2.0 micrometers, and the latter ranging typically between $1 \times 10^{16}$ and $2 \times 10^{17}$ impurity donor atoms per cubic centimeter.

At present, epitaxial gallium arsenide layers for microwave devices are commonly prepared by chemical vapor deposition techniques involving hydrogen chloride transport. The growth rate obtained from such chemical transport methods is usually high, in excess of 1,000 Angstrom units per minute. A thin layer (e.g., one needed for high frequency operation) thus requires a very short time utilizing vapor deposition techniques, meaning that control of doping and thickness may be uncertain. In the past, an excessive thickness of the deposition produced by vapor deposition techniques has been corrected by etching to the required value. Unfortunately, adequate thickness uniformity is very difficult to achieve in chemical vapor deposition since thickness distribution is sensitive to local variations in substrate temperature and non-uniformity in reactant flow rate. Consequently, even if the epitaxial layer is etched uniformly, the final structure is still non-uniform in thickness. Moreover, doping non-uniformity, especially severe in the interfacial zone between the film and substrate, occurs frequently in films grown by that method.

A second notable means of preparing device quality epitaxial gallium arsenide relies on molecular beam transport of gallium and arsenic to a heated substrate. Both N-type and P-type layers have been formed by the addition of impurities in the course of deposition; however there remains some difficulty in P-layer formation due to the low sticking coefficient of most P-type dopants such as zinc and manganese. Although uniform doping profiles are obtained with beam transport, due to the line-of-sight geometry of the deposition arrangement, this method does not lend itself to the growth of uniformly thick layers.

Radio-frequency sputtering techniques have also been used in the past for applying thin epitaxial layers, usually of oxides. A relatively low pressure (5–20 millitorr) of a non-reactive ionizable gas, usually argon, is bled into a bell jar while pumping on it with a high speed diffusion pump. A glow discharge is initiated by applying a high radio-frequency voltage between a target comprising the material from which the epitaxial layer is to be formed and a substrate support. The single-crystal substrate upon which the epitaxial film is formed is heated to a temperature high enough to induce epitaxial growth. Argon or other inert gas ions produced by the discharge are accelerated toward the target and gain sufficient energy to knock atoms or molecules from the material from which it is formed.

While the known techniques for growing epitaxial layers with RF sputtering should produce the required semiconductor thickness for microwave applications, virtually no work has yet been done on the epitaxy of semiconductors by this method. Also, no satisfactory means has heretofore been devised for introducing a dopant element into the epitaxial layer during the sputtering process.

SUMMARY OF THE INVENTION

In accordance with the present invention, a technique is provided which produces epitaxial growth of gallium arsenide and other similar semiconductors on both semi-insulating and conducting semiconductive substrates at growth rates and in conditions where doping profiles can be accurately controlled.

Specifically, there is provided a method for growing thin doped layers of epitaxial semiconductive material comprising the steps of disposing a substrate on which the epitaxial layer of semiconductive material is to be grown adjacent one of two oppositely-disposed electrodes, disposing a target of the semiconductive material from which the epitaxial layer is to be formed on the other of said two electrodes, evacuating the space around said electrodes of air while introducing into said space controlled amounts of an ionizable gas together with a gaseous chemical compound in which a dopant element is liberated in a confined radio-frequency discharge, and applying a radio-frequency potential across said two electrodes to thereby establish a radio-frequency discharge between the electrodes whereby atoms of the target will be knocked loose from the target by impinging ions on the ionizable gas and travel to the substrate to form an epitaxial layer doped with the liberated dopant element.

The above and other objects and features of the invention will become apparent from the following detailed description taken in connection with the accompanying single FIGURE drawing which forms a part of this specification.

With reference now to the drawing, the apparatus shown includes a bell jar 10 formed from glass or stainless steel and having a top plate 12 and a bottom or base plate 14. The base plate 14 as well as the top plate 12 are preferably formed from metal, the base plate 14 being grounded as shown. The top plate 12 supports an RF matching network 16 which is connected to one terminal of an RF power generator 18, the other terminal being grounded. The frequency generated by the RF generator 18 is typically about 13.5 megahertz at about 100 to 300 watts. Carried on the lower side of the top plate 12 within the bell jar 10 is a water-cooled electrode 20 electrically connected to the RF matching network 16 and carrying at its lower surface a target of sintered or single-crystal semiconductive material 22 from which an epitaxial layer is to be formed.

Disposed opposite the target 22 is a substrate 24 on which the epitaxial layer is to be formed. The substrate 24 is carried on the upper surface of a tantalum strip heater 26 carried on insulating spacers 25 disposed on the tops of supports 27 extending upwardly from plate 14. Opposite ends of the tantalum strip 26 are connected through leads 29 to a source of power, not shown, external to the bell jar whereby current can be caused to flow through the tantalum strip and thus heat the substrate. As shown, the substrate 24 is beneath the target 22 and is disposed within an opening in a circular table or electrode 31 which is electrically connected to the grounded base plate 14 through supports 33. A removable shutter 28 carried on a rotatable shaft 30 initially shields the substrate from the target at the start of the sputtering process. The shutter 28, for example, may simply comprise a circular plate. The interior of the bell jar 10 is connected via conduit 32 to a vacuum pump, not shown. The electrode or table 31 is much larger in diameter than the target 22 whereby a larger portion of the total RF voltage will be concentrated at the target.

Initially, the interior of the bell jar 10 is pumped down typically to a pressure of $10^{-7}$ torr, whereupon an argon pressure in the range of 2–8 × $10^{-3}$ torr is established by leaking gas into the chamber. This is achieved by mixing argon from an argon source 34 in mixer 36 with a source of reactive gas. If the reactive gas is normally in gaseous form (e.g., $SiH_4$, $GeH_4$, $H_2S$), it is supplied directly to the mixer 36 from a source 38. On the other hand, if the dopant element is carried in a liquid organometallic compound such as $Zn(CH_3)_2$ or $Sn(CH_3)_4$, is becomes necessary to bubble argon from source 40 through a bath 42 of the organometallic compound to form a vapor, the vapor being thereafter mixed with the main supply of argon from source 34 in mixer 36. Valves 44 in the various conduits leading to mixer 36 are used to effect the required set-up, depending upon the type of dopant compound used. In either case, the reactive gas normally comprises only about 1 part to $10^2$ or $10^3$ parts argon or other ionizable gas. When radio-frequency power is applied between the target 22 and electrode 31, sputtering begins. That is, if argon is used as the ionizable gas, argon ions produced by the discharge are accelerated toward the target and gain sufficient energy to knock atoms or molecules out of the target. Atoms knocked loose from the target by the impinging ions have sufficient velocity so that when they hit the substrate 24 they adhere to it, forming an epitaxial layer. At the same time, since the dopant element is liberated from the reactive gas in the confined radio-frequency discharge, it also forms part of the epitaxial layer, resulting in a layer of semiconductive material containing the dopant element.

If pure argon is used as the sputtering gas, the deposited films, even when in single-crystal epitaxial form, are usually of high resistivity and are not useful as the active element in microwave applications, assuming that no reactive gas is introduced. However, by adding N-type or P-type impurities in the grown films by adding an impurity bearing gas such as $SiH_4$, $GeH_4$, $H_2S$ or $H_2Se$ to the main argon stream, or by bubbling a portion of the argon through a by-pass chamber which contains organometallic liquids such as $Zn(CH_3)_2$ or $Sn(CH_3)_4$, low resistivity epitaxial fims are formed which are highly suitable in microwave applications.

P-type and N-type films of GaAs have been grown on semi-insulating GaAs substrates using $Zn(CH_3)_2$ and $SiH_4$, respectively, as dopants. Partial pressures of $Zn(CH_3)_2$ in argon range between 5 × $10^{-6}$ and $10^{-4}$ torr. The $SiH_4$ pressures are between 3 × $10^{-6}$ and $10^{-3}$ torr. Epitaxy was observed when substrates were held in the range of about 530°C to 600°C by the tantalum strip heater 26. Examinations of deposited films by electron diffraction and X-ray topography and electron microscopy show that the films are structurally continuous with low defect densities. Some care must be taken in substrate preparation to avoid the introduction of defects into the grown layers. A mechanical-chemical polish is first used followed by a chemical polish, a dip in hydrochloric acid, a rinse in boiling acetone, followed by two rinses in boiling trichloroethylene.

Films in the thickness range of about 0.2 to 3.5 microns have been grown. The following Table I shows a list of typical results:

TABLE I

| Run No. | Thickness (μm) | Cond. type. | N ($cm^{-3}$) | $cm^2$/μV-sec | Dopant (torr) (1) d.m. zinc (2) silane | Substrate temp. (°C) |
|---|---|---|---|---|---|---|
| 31 | 3.5 | intr. | — | — | $10^{-5}$ (1) | 530° |
| 32 | 3.5 | n* | 6 × $10^{-16}$ | 3260 | 2 × $10^{-5}$ (1) | 530° |
| 53 | 1.8 | p | 6.2 × $10^{15}$ | 39 | 2 × $10^{-5}$ (1) | 560° |
| 60 | 1.8 | p | 5.5 × $10^{15}$ | 48 | 5 × $10^{-5}$ (1) | 585° |
| 90 | 1.8 | intr. | — | — | 3 × $10^{-5}$ (2) | 525° |
| 91 | 1.8 | intr. | — | — | 5 × $10^{-5}$ (2) | 525° |
| 127 | 2.2 | n | 3.5 × $10^{19}$ | 16 | 1 × $10^{-3}$ (2) | 590° |

*These results differ from those anticipated from bulk data, which indicate that it acts only as an acceptor. The unexpected donor behavior has not yet been explained.

In contrast to evaporation or chemical vapor deposition methods, where thickness non-uniformity is commonly observed due to geometrical or flow pattern effects, respectively, the thickness uniformity of RF sputtered gallium arsenide and other similar semiconductive films is a simple function of target area. Typically, when sputtering from a square target (edge length 4 centimeters), a square area of deposit (length 2 centimeters) is routinely prepared uniform in thickness to within 1–2%. Also, since deposition rates can be adjusted with considerable accuracy (in RF sputtering, for a given target configuration, the rate is dependent on radio-frequency power and substrate temperature), it is readily possible to maintain thickness control to variations less than 50 Angstroms. This capability of uniform thickness with precision rate of deposition control is extremely valuable in the fabrication of high frequency devices where submicron, epitaxial layers are often involved.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. A method for growing uniformly thin doped layers of epitaxial semiconductive material comprising the steps of:

a. positioning adjacent one of two oppositely-disposed electrodes a substrate on which the epitaxial layer of semiconductive material is to be grown, b. positioning a target of semiconductive material from which the epitaxial layer is to be formed on the other of said two electrodes, (c) heating said substrate to a temperature of about 530°C to 600°C, d. evacuating the space around said electrodes of air while introducing into said space controlled amounts of an inert ionizable gas together with a reactive chemical compound in the vapor state in which a P-type or N-type dopant element is liberated in a confined radio-frequency discharge, the ionizable gas pressure being in the range of about 2 to $8 \times 10^{-3}$ torr with the reactive compound being present in the amount of about 1 part to $10^2$–$10^3$ parts inert gas, and e. applying a radio-frequency potential across said two electrodes to thereby establish a radio-frequency discharge between the electrodes whereby atoms of the target will be knocked loose from the target by impinging ions of the ionizable gas and will travel to the substrate to form an epitaxial layer doped with the liberted dopant element.

2. The method of claim 1 wherein said ionizable gas comprises argon.

3. The method of claim 1 wherein said semiconductive material from which the target is formed comprises gallium arsenide.

4. The method of claim 1 wherein said reactive chemical compound comprises a gas.

5. The method of claim 1 wherein said reactive chemical compound is initially in the form of a liquid organometallic compound, and including the steps of bubbling said ionizable gas through a bath of the liquid organometallic compound to form a vapor, and thereafter introducing said vapor into said space.

6. The method of claim 1 wherein said chemical compound in which a dopant element is liberated is selected from the group consisting of $SiH_4$, $GeH_4$, $H_2Se$, $H_2S$, $Zn(CH_3)_2$ and $Zn(CH_3)_4$.

* * * * *